United States Patent
Bosshammer et al.

(10) Patent No.: US 6,875,517 B2
(45) Date of Patent: Apr. 5, 2005

(54) COMPOSITE SHAPE PART CONTAINING POLYARYLENE SULFIDE AND SILICON RUBBER

(75) Inventors: Stephan Bosshammer, Köln (DE); Gunther Schmidt, München (DE); Frank Burkus, Atlanta, GA (US)

(73) Assignee: Ticona GmbH (DE)

( * ) Notice: Subject to any disclaimer, the term of this patent is extended or adjusted under 35 U.S.C. 154(b) by 0 days.

(21) Appl. No.: 10/296,133

(22) PCT Filed: May 16, 2001

(86) PCT No.: PCT/EP01/05549

§ 371 (c)(1),
(2), (4) Date: Aug. 11, 2003

(87) PCT Pub. No.: WO01/90266

PCT Pub. Date: Nov. 29, 2001

(65) Prior Publication Data

US 2004/0028854 A1 Feb. 12, 2004

(30) Foreign Application Priority Data

May 22, 2000 (DE) .......................... 100 25 257

(51) Int. Cl.[7] .............................................. B32B 25/20
(52) U.S. Cl. ..................... 428/447; 428/419; 425/133.5
(58) Field of Search ................. 428/447, 419; 425/133.5

(56) References Cited

U.S. PATENT DOCUMENTS

| 4,087,585 | A |   | 5/1978  | Schulz           |         |
|-----------|---|---|---------|------------------|---------|
| 5,270,086 | A |   | 12/1993 | Hamlin           |         |
| 5,360,858 | A |   | 11/1994 | Fujiki et al.    |         |
| 5,416,144 | A |   | 5/1995  | Stein et al.     |         |
| 5,792,812 | A | * | 8/1998  | Fujiki et al.    | 525/105 |
| 5,998,515 | A |   | 12/1999 | Burkus, II et al.|         |

FOREIGN PATENT DOCUMENTS

| EP | 0259984 B1 |   | 3/1988 |
|----|------------|---|--------|
| EP | 0326712 B1 |   | 8/1989 |
| EP | 0493791 A1 |   | 8/1992 |
| EP | 0503975 B1 |   | 9/1992 |
| EP | 0691364 B1 |   | 1/1996 |
| EP | 0710539 B1 |   | 5/1996 |
| EP | 0875536 A2 |   | 4/1998 |
| EP | 1 085 053  | * | 3/2001 |

* cited by examiner

Primary Examiner—Kuo-Liang Peng
(74) Attorney, Agent, or Firm—Connolly Bove Lodge & Hutz LLP

(57) ABSTRACT

The present invention describes a composite molding comprising at least one polyarylene sulfide and at least one single- or multicomponent silicone rubber. The present invention further describes a process for the production of a composite molding, where molding is carried out in a single-stage process. The present invention finally describes the use of a composite molding as a housing, such as pump housings or resonators.

13 Claims, No Drawings

COMPOSITE SHAPE PART CONTAINING POLYARYLENE SULFIDE AND SILICON RUBBER

The invention relates to a composite molding comprising at least one polyarylene sulfide and at least one elastomer.

Polyarylene sulfides have a continuous use temperature of up to 240° C. Polyarylene sulfides are flame-retardant and oxidation-resistant. Polyarylene sulfides have high hardness and stiffness. Water absorption is low. Even at high temperature, creep is low. The abovementioned properties of polyarylene sulfides make them particularly suitable for producing moldings with good mechanical properties and heat resistance. Polyarylene sulfides are chemicals- and heat-resistant, and stiff.

The high surface hardness of moldings made from polyarylene sulfides and the low coefficient of sliding friction of polyarylene sulfides may cause slipping of superposed articles and limit the operating reliability of switching components and operator components made from polyarylene sulfides.

There are known processes in which seals and damping components are prepared separately and usually mechanically anchored in an additional operation, resulting in additional work and considerable added costs.

It is known that the adhesion of addition-crosslinking silicone elastomers can be improved by one or more additives which are added to the uncrosslinked silicone rubber mixture. U.S. Pat. No. 4,087,585 achieves good adhesion to aluminum by adding two additives, a short-chain polysiloxane having at least one SiOH group and a silane having at least one epoxy group and having a Si-bonded alkoxy group.

EP-A-0 326 712 achieves improved adhesion to various plastics using a mixture or a reaction product made from (a) a silicon-free compound having at least one alcoholic OH group and having at least one alkylene group and (b) an organosilane having at least one alkoxy group and having at least one epoxy group, but relatively long reaction times (1 h) are needed at a temperature of 120° C. The long reaction times are often the result of adhesion additives which also act as inhibitors.

According to EP-A-0 503 975, only a limited amelioration of the inhibition by these additives can be obtained by selecting an optimized SiH/SiVi ratio. Adhesion to aluminum as substrate is improved only after a relatively long vulcanization time of 2 h (measured at 100° C.). Shortening of the reaction times by increasing the temperature is impossible particularly with many plastics substrates, due to lack of heat resistance.

EP-A-0 493 791 describes the use of previously known adhesion promoters together with a tetravalent zirconium compound to achieve bonding between silicone rubber and PPS.

U.S. Pat. No. 5,360,858 describes the use of alkoxysilyl compounds as adhesion promoters in combination with an organic tin compound, but a filler-free silicone mixture is used here. A qualitative assessment determines that a bond to PPS is achieved here.

EP-A-0 710 539 discloses a molding made from a combination of polyacetal and directly molded-on functional components. The functional components are composed of one or more elastomers which comprise partially or completely hydrogenated nitrile rubbers, or comprise single- or multicomponent silicone rubbers, or sulfur-containing rubbers.

EP-A-0 875 536 discloses addition-crosslinking silicone rubbers and a process for producing composite moldings. Substrates used here comprise PA and PBT.

When composite moldings are produced involving an engineering polymer, such as polyarylene sulfide, and an elastomer the engineering polymer is usually either pretreated by surface-treatment with primers or by corona treatment, low-pressure treatment, plasma treatment or, respectively, flame treatment, after injection molding. Both methods, pretreatment and adhesive modification, require expenditure and work.

The object of the present invention is to provide a composite molding made from polyarylene sulfide with a silicone elastomer without complicated pretreatment of the polyarylene sulfide during the production process, the adhesion between polyarylene sulfide and the silicone elastomer being improved.

The object is achieved by way of a composite molding comprising at least one polyarylene sulfide and comprising at least one single- or multicomponent silicone rubber as described in EP-A-0 875 536 or U.S. Pat. No. 5,998,515.

Polyarylene sulfides may be prepared via dihalogenated aromatic compounds. Preferred dihalogenated aromatic compounds are p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone, 4,4'-dichlorodiphenyl sulfoxide, and 4,4'-dichlorodiphenyl ketone.

The polyarylene sulfide is obtained as described in EP-A-0 259 984 in a two-stage polymerization process for prepolymerization and main polymerization, polymerizing a dihalogenated aromatic compound with an alkali metal sulfide in a polar aprotic organic solvent to give polyarylene sulfide.

According to the invention, the preferred polyarylene sulfide used to produce composite moldings is polyphenylene sulfide. Polyphenylene sulfide (PPS) is a linear semicrystalline polymer having the formula:
where n>1.

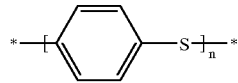

Very good resistance to chemicals means that polyphenylene sulfide is also used to produce housings. Polyphenylene sulfides have a low mechanical damping factor, making the use of soft damping components a requirement in some applications. When moldings made from polyphenylene sulfide are installed, connection sites often require a seal.

It has now been found that silicone rubbers as described in EP-A-0 875 536 or U.S. Pat. No. 5,998,515 has very good adhesion to the polyphenylene sulfide of the molding without any adhesive modification of the polyphenylene sulfide or pretreatment thereof after injection molding.

Addition-crosslinking mixtures which comprise at least one hydrosiloxane having at least 2 SiH groups and comprise an alkoxysilane or alkoxysiloxane having at least one epoxy group and, where appropriate, a peroxide have good adhesion to substrates and low reactivity. The mixture can be processed without any large number of additional components.

Addition-crosslinking silicone rubber mixtures comprise
a) 100 parts of at least one linear or branched organopolysiloxane containing alkenyl groups and having at least 2 alkenyl groups, with a viscosity of from 0.01 to 30 000 Pas, b) at least one hydrosiloxane having at least 2 SiH functions per molecule in an amount such that the molar ratio of the SiH group to the total amount of Si-bonded alkenyl groups is at least 1.5, c) at least one Pt or Rh catalyst and, where appropriate, an inhibitor, d) from 0.1 to 10 parts of at least one alkoxysilane having at least one epoxy group and/or alkoxysiloxane having at least one epoxy group, or of silanes as described in EP 902059, U.S. Pat. Nos. 3,730,932 and 5,998,515, and, where appropriate, e) from 0 to 200, preferably from 5 to 200, parts of at least one, where appropriate surface-modified, filler, and, where appropriate, f) other auxiliaries, such as phenylsilicone oils for self-lubricating mixtures or color pastes, such as from 10 to 70% by weight of silicone oils comprising pigments, and also g) where appropriate, a peroxide.

The term organopolysiloxane (a) encompasses all of the polysiloxanes used hitherto in crosslinkable organopolysiloxane compositions. (a) is preferably a siloxane composed of units of the formula (I)

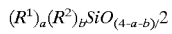

$$(R^1)_a(R^2)_b SiO_{(4-a-b)/2} \quad (I)$$

where $R^1$ is a monovalent aliphatic radical having from 1 to 8 carbon atoms, preferably methyl, and $R^2$ is an alkenyl radical having from 2 to 8 carbon atoms, preferably vinyl, a=0, 1, 2 or 3, b=0, 1 or 2 and the sum a+b=0, 1, 2, or 3, with the proviso that on average at least two radicals $R^2$ are present per molecule. (a) preferably has dimethylvinylsiloxane capping. The data in parts here are all based on parts by weight. Organopolysiloxanes (a) preferably have viscosities of from 0.01 to 200 Pas, very particularly preferably from 0.2 to 200 Pas. The viscosities are determined to DIN 53 019 at 20° C.

As a result of the preparation process, in particular in the case of the branched polymers, which may also be solid resins dissolved in solvents (solid resin content from 10 to 80% by weight), up to a maximum of 10 mol % of all of the Si atoms may also have alkoxy or OH groups. Hydrosiloxanes (b) are preferably linear, cyclic, or branched organopolysiloxanes composed of units of the formula (II)

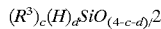

$$(R^3)_c(H)_d SiO_{(4-c-d)/2} \quad (II)$$

where $R^3$ is a monovalent aliphatic radical having from 1 to 8 carbon atoms, preferably methyl, c=0, 1, 2, or 3, d=0, 1, or 2, where the sum c+d=0, 1, 2, or 3, with the proviso that on average there are at least 20 Si-bonded hydrogen atoms.

The hydrosiloxanes (b) preferably have a viscosity of from 0.01 to 5 Pas. The hydrosiloxanes (b) may also comprise organopolysiloxanes whose number of SiH groups x is 2<x<20.

Catalysts (c) for the crosslinking reaction are preferably Pt (O) complexes having alkenylsiloxanes as ligands, in catalytic amounts of from 1 to 100 ppm. Inhibitors are any of the commonly used compounds used hitherto for this purpose, for example alkylols or vinylsiloxanes in amounts of from 50 to 10 000 ppm.

Preferred alkoxysilanes or alkoxysiloxanes (d) which have at least one epoxy group are those whose alkoxy function has not more than 5 carbon atoms, in amounts of from 0.1 to 10 parts, based on the total of all of the components, cf. EP-A-0 691 364.

The invention also provides a composite molding where the silicone rubber is an addition-crosslinked silicone rubber mixture comprising a) 100 parts of at least one linear or branched organopolysiloxane containing alkenyl groups and having at least 2 alkenyl groups, with a viscosity of from 0.01 to 30 000 Pas, b) at least one hydrosiloxane having at least 2 SiH functions per molecule in an amount such that the molar ratio of the SiH group to the total amount of Si-bonded alkenyl groups is at least 1.5, c) at least one Pt or Rh catalyst and, where appropriate, an inhibitor, d) from 0.1 to 10 parts of at least one alkoxysilane having at least one epoxy group and/or alkoxysiloxane having at least one epoxy group, and, where appropriate, e) from 0 to 200, preferably from 5 to 200, parts of at least one, where appropriate surface-modified, filler, and, where appropriate, f) other auxiliaries, such as phenylsilicone oils for self-lubricating mixtures or color pastes, such as from 10 to 70% by weight of silicone oils comprising pigments, and also g) where appropriate, a peroxide.

Fillers (e) are preferably reinforcing fillers, such as fumed or precipitated silica with BET surface areas of from 50 to 400 m²/g, which may also have surface treatment, in preferred amounts of from 10 to 50 parts, and/or extender fillers, such as quartz flour, diatomaceous earths. The surface treatment of the fillers may also be carried out in situ by adding silazanes, such as hexamethylsilazane and/or divinyltetramethyldisilazane, or vinylalkoxysilanes, such as vinyltrimethoxysilane, and water, or other commonly used filler-treatment agents, such as alkoxysilanes or siloxanediols.

The mixture may comprise other auxiliaries (f), such as phenylsilicones, which give self-lubricating vulcanizates, for example copolymers composed of dimethylsiloxy and diphenylsiloxy or methylphenylsiloxy groups, or else polysiloxanes having methylphenylsiloxy groups, with a viscosity which is preferably from 0.1 to 10 Pas, or color pastes. The amount of auxiliaries is preferably from 0 to 10 parts by weight, preferably from 0.05 to 10 parts by weight.

The silicone rubber mixture may also comprise at least one peroxide (g) in amounts of from 0.1 to 2 parts, based on the entire mixture. Preferred peroxides (g) are aroyl peroxides. The amount of peroxide is usually from 0 to 1% by weight, preferably from 0.1 to 0.5% by weight.

The composite moldings are sealing and/or damping components and regions for improving slip resistance, for example grip recesses.

The composite moldings made from polyphenylene sulfide and from a silicone elastomer are preferably produced by a single-stage process via an insert technique, or in a multicomponent injection-molding process, or by coextrusion, casting, calendering, or the like.

The use of the above silicone elastomers permits the direct molding-on of sealing or damping components to moldings made from polyphenylene sulfide, without any requirement for other assembly steps. The omission of the processing steps needed hitherto for the assembly of functional components can achieve a considerable cost saving in the production of the composite moldings of the invention and in their assembly.

Fields of application for the composite moldings of the invention are housings in automotive construction, for example resonators, valve covers, valve pistons, air mass flow meters, or sanitary parts, for example.

Other suitable engineering polymers for the purposes of the invention besides polyarylene sulfide are polyphenylene sulfone or polyphenylene sulfoxide.

The invention is described in more detail using examples. Adhesion is determined either qualitatively on the molding or quantitatively via the peel force to DIN 53 289.

EXAMPLES

Example 1

A sheet of Fortron® 1140 L4 polyphenylene sulfide was placed in a mold. The silicone rubber mixture LIM 9070 was applied to the sheet. The mold was then heated to a temperature of 175° C. and the housing was pressed for 15 min in a press. Poor adhesion is found.

Example 1a

A sheet of Fortron® 4332 L6 polyphenylene sulfide was placed in a mold. The silicone rubber mixture LIM 9070 was applied to the sheet. The mold was then heated to a temperature of 175° C. and the housing was pressed for 15 min in a press. Poor adhesion is found.

Example 2

A sheet of Fortron® 1140 L4 polyphenylene sulfide was placed in a mold. The silicone rubber mixture LSR 2040+2% VP Al 3662 was applied to the sheet. The mold was then heated to a temperature of 175° C. and the housing was pressed for 15 min in a press. Cohesion is found.

Example 2a

A sheet of Fortron® 4332 L6 polyphenylene sulfide was placed in a mold. The silicone rubber mixture LSR 2040+2% VP Al 3662 was applied to the sheet. The mold was then heated to a temperature of 175° C. and the housing was pressed for 15 min in a press. Cohesion is found.

Example 3

Sheets (2 test specimens) of Fortron® 1140 L4 polyphenylene sulfide were preheated to 150° C. and placed in a mold. The silicone rubber mixture LIM 9070 was applied to the sheet. The mold was then heated to a temperature of 175° C. and the housing was pressed for 10 min in a press. The peel force found to DIN 53 289 is 1.7 N/mm.

Example 3a

Sheets (2 test specimens) of Fortron® 4332 L6 polyphenylene sulfide were preheated to 150° C. and placed in a mold. The silicone rubber mixture LIM 9070 was applied to the sheet. The mold was then heated to a temperature of 175° C. and the housing was pressed for 10 min in a press. The peel force found to DIN 53 289 is 2.2 N/mm.

Example 4

Sheets (2 test specimens) of Fortron® 1140 L4 polyphenylene sulfide were placed in a mold. The silicone rubber mixture LSR 2040+2% VP Al 3662 was applied to the sheet. The mold was then heated to a temperature of 175° C. and the housing was pressed for 10 min in a press. The peel force found to DIN 53 289 is 4.3 N/mm.

Example 4a

Sheets (2 test specimens) of Fortron® 4332 L6 polyphenylene sulfide were placed in a mold. The silicone rubber mixture LSR 2040+2% VP Al 3662 was applied to the sheet. The mold was then heated to a temperature of 175° C. and the housing was pressed for 10 min in a press. The peel force found to DIN 53 289 is 3.3 N/mm.

The composite moldings of the following examples were produced (mold temperature 150° C.) on an injection-molding machine with a rotary-table mold, where in the first step a polyphenylene molding can be produced and in the second step, in parallel with the production of another polyphenylene molding, a silicone seal can be molded onto the first molding.

Example 5

The polyphenylene sulfide used comprised Fortron® 1140 L4 and the silicone rubber used comprised LIM 9070. Cohesion was found.

Example 6

The polyphenylene sulfide used comprised Fortron® 1140 L4 and the silicone rubber used comprised LSR 2040+2% VP Al 3662. Cohesion was found.

What is claimed is:

1. A process for producing a composite molded part, comprising the steps of applying at least one addition-crosslinking silicone rubber mixture onto at least one polyarylene sulfide substrate by injection molding, coextrusion, casting, or calendering, followed by the steps of heating and pressing, wherein the silicone rubber is applied as a mixture comprising the following components:

a) 100 parts of at least one linear or branched organopolysiloxane containing alkenyl groups and having at least 2 alkenyl groups, with a viscosity of from 0.01 to 30,000 Pas;

b) at least one hydrosiloxane having at least two SiH functions per molecule in an amount such that the molar ratio of the SiH group to the total amount of Si-bonded alkenyl groups is at least 1.5;

c) at least one Pt catalyst or Rh catalyst; and d) from 0.1 to 10 parts of at least one alkoxysilane having at least one epoxy group and/or alkoxysiloxane having at least one epoxy group.

2. A process for producing housings comprising the step of using a composite molding obtained from the process of claim 1 to produce the housings.

3. A process for producing non-slip operator components comprising the step of using a composite molding obtained by the process of claim 1 to produce the components.

4. A process for producing a product selected from the group consisting of flat crankshaft seals, air mass flow meters, and heat exchangers comprising the step of using a composite molding obtained from the process of claim 1 to produce the product.

5. The process as claimed in claim 1, comprising an insert technique wherein the addition-crosslinking silicone rubber mixture is injection-molded onto a preformed polyarylene sulfide substrate.

6. The process as claimed in claim 1, comprising a multicomponent injection-molding process wherein the polyarylene sulfide substrate is first formed by injection molding, left in the mold, and subsequently the silicone rubber mixture is injection-molded onto the polyarylene sulfide substrate.

7. The process as claimed in claim 5, wherein the polyarylene sulfide substrate is preheated prior to applying the silicone rubber mixture.

8. The process as claimed in claim 1 wherein the polyarylene sulfide is polyphenylene sulfide.

9. A process as claimed in claim 1, wherein the mixture components further include an inhibitor.

10. A process as claimed in claim 1, wherein the mixture components further include a surface modified filler.

11. A process as claimed in claim 1, wherein the mixture components further include phenylsilicone oils.

12. A process as claimed in claim 1, wherein the mixture components further include color pastes.

13. A process as claimed in claim 1, wherein the mixture components further include a peroxide.

* * * * *

UNITED STATES PATENT AND TRADEMARK OFFICE
CERTIFICATE OF CORRECTION

PATENT NO. : 6,875,517 B2
DATED : April 5, 2005
INVENTOR(S) : Stephan Bosshammer et al.

It is certified that error appears in the above-identified patent and that said Letters Patent is hereby corrected as shown below:

<u>Title page,</u>
Item [75], Inventors, add -- Frank Reil, Seeheim (DE) --.

Signed and Sealed this

Fourth Day of October, 2005

JON W. DUDAS
*Director of the United States Patent and Trademark Office*